US008938337B2

(12) United States Patent
Nakakura et al.

(10) Patent No.: US 8,938,337 B2
(45) Date of Patent: Jan. 20, 2015

(54) VEHICLE DOOR CONTROL APPARATUS AND METHOD FOR CONTROLLING VEHICLE DOOR

(75) Inventors: Yohei Nakakura, Obu (JP); Toshiyuki Konishi, Anjo (JP); Hideki Hioki, Ichinomiya (JP); Yoshihisa Okada, Kariya (JP); Mitsuyasu Matsuura, Chiryu (JP); Toshiki Isogai, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 1339 days.

(21) Appl. No.: 12/565,245

(22) Filed: Sep. 23, 2009

(65) Prior Publication Data

US 2010/0076651 A1 Mar. 25, 2010

(30) Foreign Application Priority Data

Sep. 25, 2008 (JP) ................................ 2008-246665
Feb. 24, 2009 (JP) .................................. 2009-41185

(51) Int. Cl.
*B60R 25/10* (2013.01)
*E05F 15/00* (2006.01)
(Continued)

(52) U.S. Cl.
CPC ............ *E05C 17/00* (2013.01); *E05C 15/0026* (2013.01); *G01S 7/4811* (2013.01);
(Continued)

(58) Field of Classification Search
CPC B60R 25/10; B60R 25/1001; B60R 25/1003; B60R 25/1004; B60R 21/0134; B60R 21/0136
USPC ......... 701/1, 45, 49; 340/426.24–426.29, 436
See application file for complete search history.

(56) References Cited

U.S. PATENT DOCUMENTS 4,458,446 A * 7/1984 Mochida et al. ................... 49/28
4,581,936 A * 4/1986 Granz et al. ..................... 73/599
(Continued)

FOREIGN PATENT DOCUMENTS

JP 2-132515 11/1990
JP H-08285184 A * 11/1996 ................ B60J 5/00
(Continued)

OTHER PUBLICATIONS

Japanese Office Action dated Jun. 5, 2012, issued in corresponding Japanese Application No. 2009-041185 with English translation.
(Continued)

*Primary Examiner* — Jack W Keith
*Assistant Examiner* — Chuong P Nguyen
(74) *Attorney, Agent, or Firm* — Nixon & Vanderhye PC

(57) ABSTRACT

A laser sensor is located close to a rotation axis of a vehicle door and configured to emit a laser beam to a surface of the vehicle door and accept reflected light reflected from an obstacle for scanning a scanning plane shifted in a door-opening direction, in which the vehicle door is openable. A determination section determines whether an obstacle, which is possible to make contact with the vehicle door, exists in the door-opening direction of the vehicle door, based on a result of emission and acceptance of the laser beam of the laser sensor. An opening regulating section regulates an opening of the vehicle door in response to determination of the determination section that the obstacle exists.

1 Claim, 13 Drawing Sheets

(51) Int. Cl.
*E05C 17/00* (2006.01)
*G01S 7/481* (2006.01)
*G01S 17/02* (2006.01)
*G01S 17/42* (2006.01)
*G05B 19/4061* (2006.01)

(52) U.S. Cl.
CPC .............. *G01S 17/026* (2013.01); *G01S 17/42* (2013.01); *G05B 19/4061* (2013.01); *E05C 17/006* (2013.01); *E05F 2015/0047* (2013.01); *E05F 2015/0086* (2013.01); *E05Y 2900/531* (2013.01); *G01S 7/4817* (2013.01); *G05B 2219/37631* (2013.01); *G05B 2219/45242* (2013.01)
USPC .............. 701/49; 701/1; 701/45; 340/426.24; 340/426.25; 340/426.26; 340/426.27; 340/426.28; 340/426.29; 340/436

(56) References Cited

U.S. PATENT DOCUMENTS

| | | | | |
|---|---|---|---|---|
| 5,235,316 | A * | 8/1993 | Qualizza | 340/436 |
| 5,628,034 | A * | 5/1997 | McIntyre | 396/52 |
| 5,949,530 | A * | 9/1999 | Wetteborn | 356/5.01 |
| 6,343,810 | B1 * | 2/2002 | Breed | 280/730.2 |
| 7,000,721 | B2 | 2/2006 | Sugawara et al. | |
| 7,193,509 | B2 * | 3/2007 | Bartels et al. | 340/436 |
| 7,391,301 | B2 * | 6/2008 | Seike et al. | 340/426.1 |
| 7,528,703 | B2 * | 5/2009 | Touge | 340/435 |
| 7,761,209 | B2 * | 7/2010 | Morris et al. | |
| 8,280,593 | B2 * | 10/2012 | Nakakura et al. | 701/49 |
| 8,370,021 | B2 * | 2/2013 | Okada et al. | 701/36 |
| 2002/0189168 | A1 * | 12/2002 | Sicuranza | 49/26 |
| 2004/0101165 | A1 | 5/2004 | Gallo et al. | |
| 2004/0200149 | A1 * | 10/2004 | Dickmann et al. | 49/26 |
| 2005/0085972 | A1 * | 4/2005 | Martinez | 701/49 |
| 2005/0242618 | A1 * | 11/2005 | Menard | 296/146.4 |
| 2007/0024431 | A1 | 2/2007 | Touge | |
| 2008/0068584 | A1 * | 3/2008 | Mori et al. | 356/5.01 |
| 2009/0000196 | A1 * | 1/2009 | Kollar et al. | 49/28 |
| 2009/0033477 | A1 * | 2/2009 | Illium et al. | 340/436 |
| 2010/0082206 | A1 * | 4/2010 | Kollar et al. | 701/49 |
| 2010/0145617 | A1 * | 6/2010 | Okada et al. | 701/300 |
| 2010/0228448 | A1 * | 9/2010 | Nakakura et al. | 701/49 |
| 2011/0295469 | A1 * | 12/2011 | Rafii et al. | 701/49 |
| 2014/0168630 | A1 * | 6/2014 | Iida et al. | 356/3 |

FOREIGN PATENT DOCUMENTS

| | | | | |
|---|---|---|---|---|
| JP | 10-109592 | | 4/1998 | |
| JP | 3052491 | | 4/2000 | |
| JP | 2004-157044 | | 6/2004 | |
| JP | 2004-230993 | | 8/2004 | |
| JP | P2004-284410 A | | 10/2004 | |
| JP | 2005-48581 | | 2/2005 | |
| JP | 2006-316489 | | 11/2006 | |
| JP | 2006-316497 | | 11/2006 | |
| JP | 2006316489 A | * | 11/2006 | ............... B60J 5/00 |
| JP | 2006316497 A | * | 11/2006 | ............... B60J 5/00 |
| JP | 2006-349449 | | 12/2006 | |
| JP | P2007-137361 A | | 6/2007 | |
| JP | 2007-176293 | | 7/2007 | |
| JP | 2007175293 A | * | 7/2007 | ............... B60J 5/00 |
| JP | P2007-302173 A | | 11/2007 | |
| JP | 2003104055 A | * | 4/2009 | ............... B60J 5/00 |

OTHER PUBLICATIONS

Japanese Official Action dated Dec. 4, 2012 issued in corresponding Japanese Application No. 2009-041185, with English translation.

* cited by examiner

FIG. 7

| ANGLE θ | DISTANCE TO OBSTACLE X | SET DISTANCE L | COMPARISON | OBSTACLE |
|---|---|---|---|---|
| θ1 | X1 | L1 | X1>L1 | NOT EXIST |
| θ2 | X2 | L2 | X2<L2 | EXIST |
| θ3 | X3 | L3 | X3>L3 | NOT EXIST |
| ... | ... | ... | ... | ... |
| θn | Xn | Ln | Xn>Ln | NOT EXIST |

VEHICLE DOOR CONTROL APPARATUS AND METHOD FOR CONTROLLING VEHICLE DOOR

CROSS REFERENCE TO RELATED APPLICATIONS

This application is based on and incorporates herein by reference Japanese Patent Applications No. 2008-246665 filed on Sep. 25, 2008 and No. 2009-41185 filed on Feb. 24, 2009.

TECHNICAL FIELD

The present invention relates to a vehicle door control apparatus for controlling an opening operation of a vehicle door and protecting the vehicle door from an obstacle. The present invention further relates to a method for controlling the vehicle door and protecting the vehicle door from an obstacle.

BACKGROUND

Conventionally, as disclosed in JP-U-2-132515, for example, an ultrasonic sensor is provided in a vehicle door. The ultrasonic sensor detects the distance from the vehicle door to an obstacle for protecting the vehicle door from the obstacle when the vehicle door is opened. The ultrasonic sensor provided in the vehicle door emits an ultrasonic pulse perpendicularly to an outer surface of the vehicle door and accepts the ultrasonic pulse reflected from an obstacle. Thus, the ultrasonic sensor detects the distance from the vehicle door to the obstacle. In general, one ultrasonic sensor is capable of detecting an obstacle in a limited area, which is insufficient for including the entire vehicle door. Therefore, in JP-U-2-132515, one vehicle door is provided with multiple ultrasonic sensors for detecting an obstacle throughout a large area of the vehicle door. However, cost of the entire apparatus may significantly increase due to provision of a large number of sensors.

BRIEF SUMMARY

In view of the foregoing and other problems, it is an object of the present exemplary embodiment to produce a vehicle door control apparatus capable of detecting an obstacle, which may make contact with a vehicle door, in a large surface of the vehicle door by using a single element of a sensor.

According to one aspect of the present invention, a vehicle door control apparatus for a vehicle comprises a laser sensor located close to a rotation axis of a vehicle door and configured to emit a laser beam to a surface of the vehicle door and accept reflected light reflected from an obstacle for scanning a scanning plane shifted in a door-opening direction, in which the vehicle door is openable. The vehicle door control apparatus further comprises determination means for determining whether an obstacle, which is possible to make contact with the vehicle door, exists in the door-opening direction of the vehicle door, based on a result of emission and acceptance of the laser beam of the laser sensor. The vehicle door control apparatus further comprises opening regulating means for regulating an opening of the vehicle door in response to determination of the determination means that the obstacle exists.

According to another aspect of the present invention, a method, which is for controlling a vehicle door, comprises rotating a single element of laser sensor, which is located close to a rotation axis of a vehicle door, around an axis for scanning a scanning plane, which is inclined from a surface of the vehicle door by a predetermined angle in a door-opening direction, in which the vehicle door is openable, while repeating emission of a laser beam from the laser sensor to the surface of the vehicle door and accepting reflected light of the laser beam reflected from an obstacle. The method further comprises determining whether an obstacle exists in the door-opening direction of the vehicle door and is possible to make contact with the vehicle door based on a result of acceptance of the laser beam. The method further comprises regulating the opening of the vehicle door in response to determination that the obstacle exists.

BRIEF DESCRIPTION OF THE DRAWINGS

The above and other objects, features and advantages of the present exemplary embodiments will become more apparent from the following detailed description made with reference to the accompanying drawings. In the drawings:

FIG. 7 is a table showing an example of determination whether an obstacle exists in the movable range of the vehicle door based on the obstacle detection range data;

DETAILED DESCRIPTION OF PREFERRED EMBODIMENTS

First Embodiment

Figure 1:
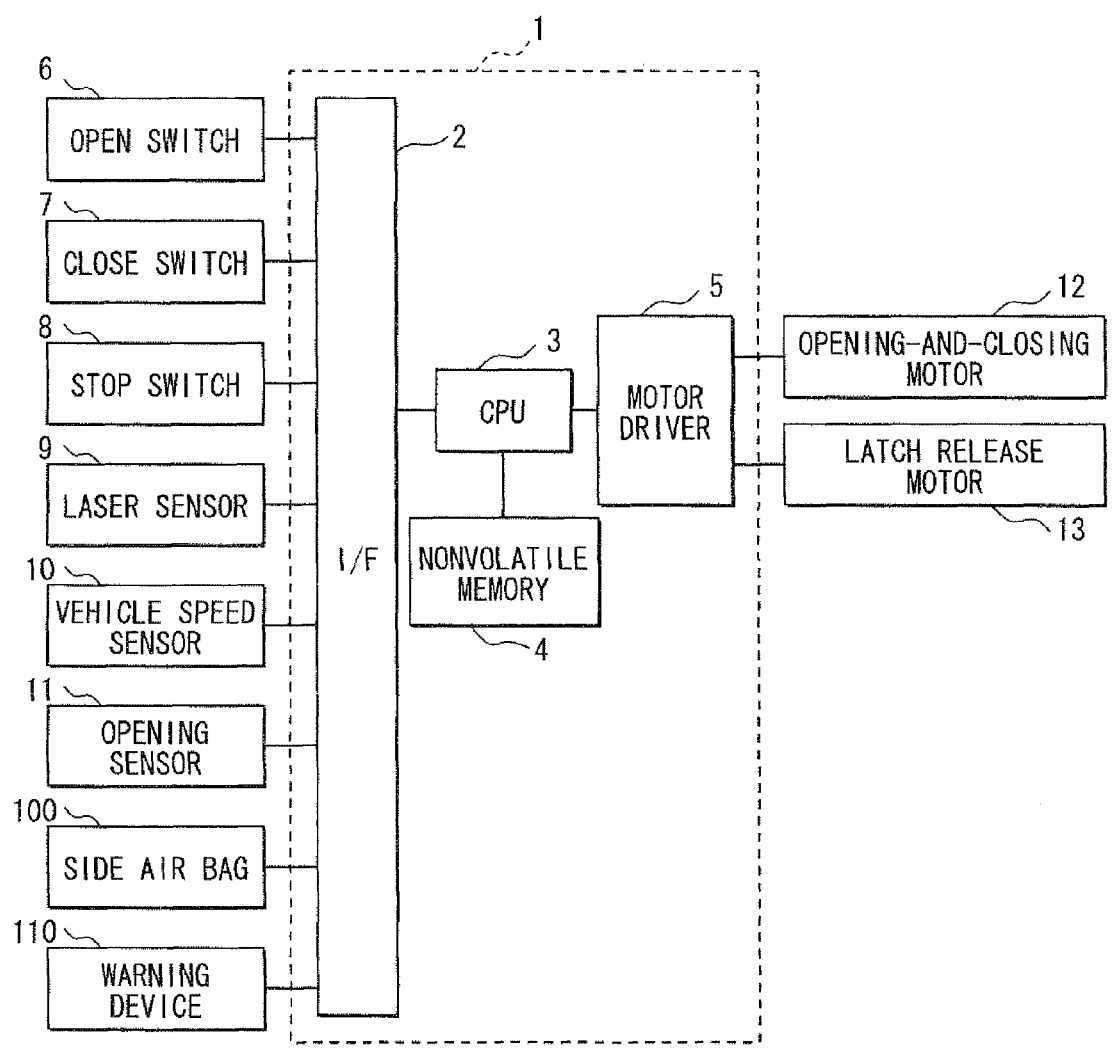
FIG. 1 is a block diagram showing a structure of a vehicle door position control apparatus.

As follows, the first embodiment will be described with reference to drawings. FIG. 1 is a block diagram showing a structure of a vehicle door position control apparatus (vehicle door control apparatus) of the present embodiment.

As shown in FIG. 1, the vehicle door control apparatus includes an ECU 1, which performs various control processings, switches 6 to 8, sensors 9 to 11, and an opening-and-closing motor 12 and a latch release motor 13 for opening and closing a vehicle door. According to the present embodiment, the vehicle door is automatically opened and closed by using two kinds of motors in response to a user's switch operation. FIG. 1 shows a structure for automatically opening and closing the single vehicle door. It is noted that the vehicle door control apparatus according to the present embodiment may be applied to at least one vehicle door such as a vehicle door of a driver's seat. Alternatively, the vehicle door control apparatus may be applied to vehicle doors of a driver's seat and a passenger seat. Alternatively, the vehicle door control apparatus may be applied to all the vehicle doors. When the vehicle door control apparatus according to the present embodiment is applied to each of multiple vehicle doors, the apparatus shown in FIG. 1 is provided to each of the vehicle doors.

The switches 6 to 8 in FIG. 1 are located in an interior of the vehicle, and are operated by a user such as an occupant of the vehicle. The open switch 6 is operated to open a vehicle door. The close switch 7 is operated to close the opened vehicle door. The stop switch 8 is operated to stop an opening or closing operation of the vehicle door. In response to an operation, each of the switches 6 to 8 outputs a manipulate signal to the ECU 1.

A laser sensor 9 is provided, for example, in a lower portion of a door mirror, which is mounted on a vehicle door. The laser sensor 9 includes a light emitting element, a scanning mechanism, a photo acceptance unit, and a control circuit. The light emitting element emits a laser beam. The scanning mechanism changes the direction of radiation of the laser beam, which is emitted from the light emitting element, within a predetermined plane thereby to scan the plane by the laser beam. The photo acceptance unit receives the laser beam reflected by an obstacle. The control circuit calculates the distance from the obstacle in accordance with an elapsed time between emission and acceptance of the laser beam. In response to detection of an obstacle, the laser sensor 9 outputs a signal of the distance from the obstacle to the ECU 1.

Figure 2:
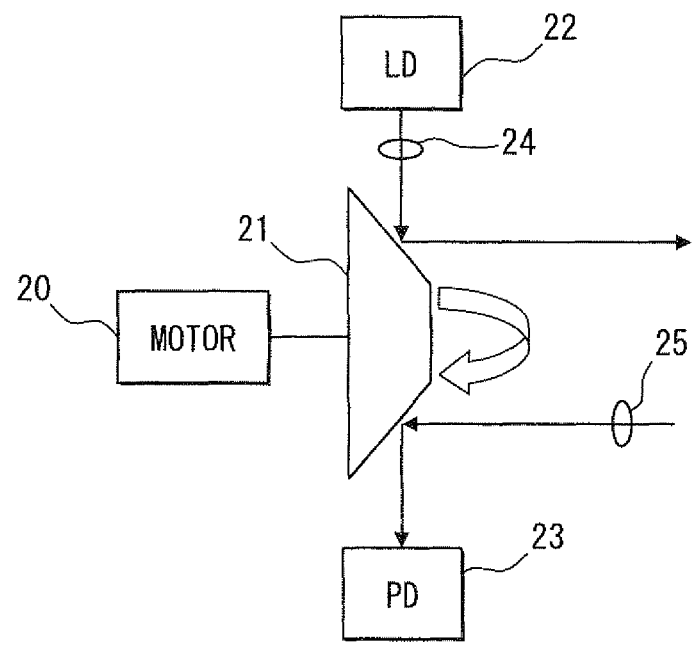
FIG. 2 is a schematic view showing an example of a scanning mechanism of a laser sensor.

As shown in FIG. 2, the scanning mechanism of the laser sensor 9 includes, for example, a mirror 21, which reflects the laser beam, a motor 20 for rotating the mirror 21, and lenses 24, 25. The mirror 21 is substantially in a pillar-shape. The mirror 21 has one end having a reflective surface for reflecting the laser beam emitted from a light emitting element 22. The mirror 21 has another end having a reflective surface for reflecting the laser beam (light), which is reflected from the obstacle, toward a photo acceptance unit 23. The motor 20 rotates the mirror 21 around a rotation axis, which extends through both the reflective surfaces, and thereby to scan a plane having a center, which coincides with the rotation axis of the motor 20. Thus, the mirror 21 emits the laser beam at multiple angles. The lens 24 is designed to modify the laser beam to be in a shape of a beam or at a predetermined spread angle. The lens 25 converges light, which is reflected from the obstacle and to be received by the mirror 21. A scanning plane and a scanning range of the laser sensor 9 will be described later in detail. The scanning mechanism shown in FIG. 2 is one example and may have another generally-known structure. For example, a mirror and an actuator of the mirror may be formed on a semiconductor substrate by a micro electromechanical system (MEMS). The vehicle speed sensor 10 generates a speed signal according to a running speed of the vehicle. The opening sensor 11 detects a position (opening) of a vehicle door when the vehicle door is opened, and generates a detection signal. The opening sensor 11 may cause information of a speed of opening of the vehicle door. The ECU 1 inputs the signals from the vehicle speed sensor 10 and the opening sensor 11.

The ECU 1 includes an input interface (input I/F) 2, a CPU 3, a nonvolatile memory 4, and a motor driver 5. The input interface 2 receives operation signals of the switches 6 to 8 and detection signals of the sensors 9 to 11. The CPU 3 executes predetermined programs and performs processings. The nonvolatile memory 4 stores the programs and obstacle detection range data. The motor driver 5 outputs a driving signal for manipulating the opening-and-closing motor 12 and the latch release motor 13.

As follows, an operation of the opening-and-closing motor 12 and the latch release motor 13 at the time of automatically opening and closing a vehicle door will be described. The latch release motor 13 is provided in the vehicle door for causing a latch mechanism (not shown), which holds the vehicle door at a closed position, to cancel a latch condition. In response to an operation of the latch release motor 13, the vehicle door becomes openable. The opening-and-closing motor 12 is also provided in the vehicle door for manipulating a door opening-and-closing mechanism (not shown) to open the vehicle door 30 at a predetermined opening (maximum opening, maximum angle) and close the vehicle door 30. In an opening operation of the vehicle door by the opening-and-closing motor 12, when the stop switch 8 is operated or an obstacle, which may make contact with the vehicle door, is detected, the opening operation is stopped even in a condition where the opening of vehicle door is less than a predetermined opening. In this case, the vehicle door is held at an opening when the opening-and-dosing motor 12 is stopped.

Figure 3:
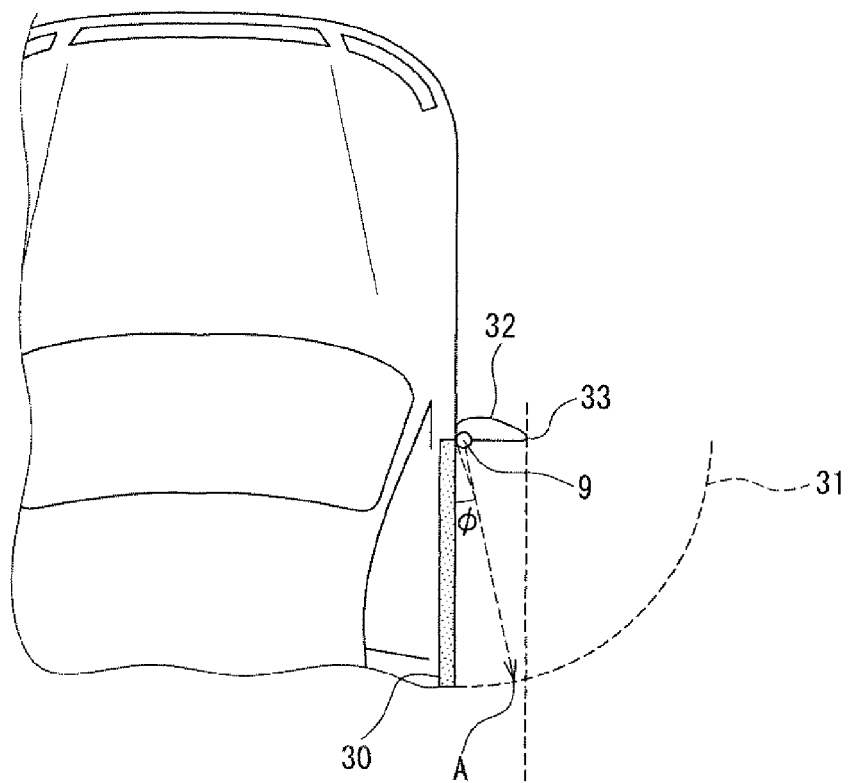
FIG. 3 is a schematic view showing a scanning plane of a laser beam emitted from the laser sensor.

Subsequently, the scanning plane and the scanning range of the laser beam emitted from the laser sensor 9 will be described with reference to FIGS. 3 to 5. The laser sensor 9 is provided in the lower portion of a door mirror 32. The laser sensor 9 emits a laser beam so as to scan a scanning plane of the laser sensor 9. As shown in FIG. 3, with respect to the surface of the vehicle door 30, the scanning plane is at a predetermined-angle φ and located at the opening side of the vehicle door 30. Referring to FIG. 3, the vehicle door 30 is supported by and rotatable around a support axis (not shown) relative to a lateral side of the vehicle. As the vehicle door 30 is opened, an outermost peripheral end of the vehicle door 30 moves along a dotted line 31. The dotted line 31 shows a locus of the outermost peripheral end of the vehicle door 30.

According to the present embodiment, referring to FIG. 3, a position of the scanning plane of the laser sensor 9, which coincides with the outermost peripheral end of the vehicle door 30 when the vehicle door 30 rotates to be opened, is closer to the vehicle door 30 than a tip end position 33 of the door mirror 32. More specifically, the scanning plane of the laser sensor 9 intersects with the dotted line 31, which shows the locus of the outermost peripheral end of the vehicle door 30 when the vehicle door 30 rotates to be opened, at a position A. The position A is set to be closer to the vehicle door 30 than the tip end position 33 of the door mirror 32.

As described above, with respect to the surface of the vehicle door 30, the scanning plane of the laser sensor 9 is set at the position, which is at the predetermined-angle φ and shifted to the direction in which the vehicle door 30 is opened. That is, the scanning plane is located on the opening side of the vehicle door 30. According to the present structure, the laser sensor 9 cannot detect an obstacle, which exists within the range in the predetermined angle φ from the vehicle door 30.

It is noted that the tip end of the door mirror 32, which is mounted on the vehicle door 30, defines an outermost point in the width direction of the vehicle. Usually, a vehicle is parked such that the door mirror 32 does not make contact with an obstacle. According to the present structure, the scanning plane of the laser sensor 9 has the position A, which corresponds to the outermost peripheral end of the vehicle door 30 and is closer to the vehicle door 30 than the tip end position 33 of the door mirror 32. Therefore, a dead band of the laser sensor 9, in which an obstacle cannot be detected, can be substantially eliminated.

Figure 4:
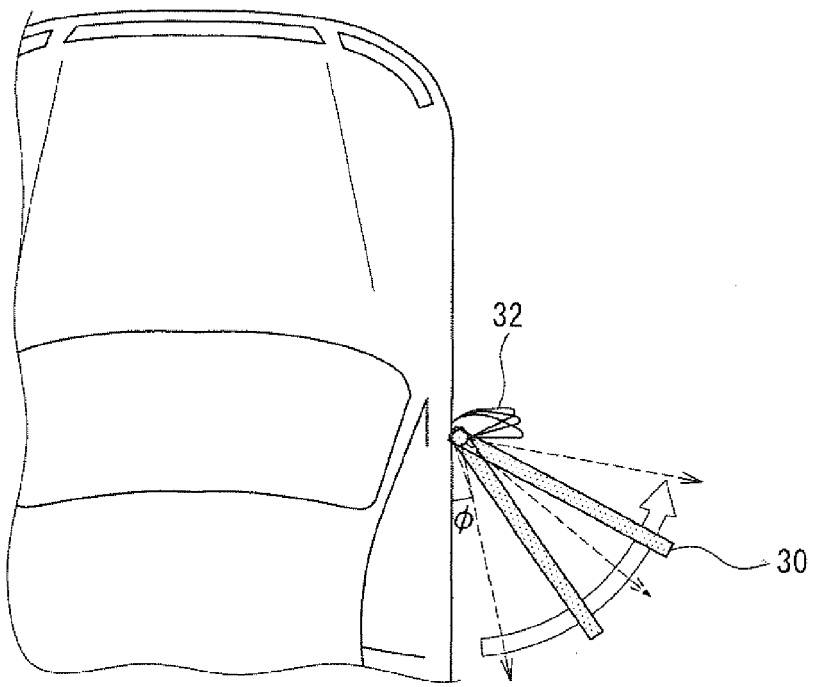
FIG. 4 is a schematic view showing the scanning plane of the laser beam, which is emitted from laser sensor, moving while maintaining a constant angle relative to the vehicle door, as a vehicle door is opened.

Furthermore, in the present structure, the scanning plane of the laser sensor 9 is deviated from the surface of the vehicle door 30 by the predetermined-angle φ, and whereby, as shown in FIG. 4, an obstacle can be regularly detected at a position in advance of the vehicle door by the predetermined angle φ while the vehicle door 30 is opened. That is, the scanning plane of the laser sensor 9 is set to be away from the surface of the vehicle door 30 by the predetermined-angle φ, and thereby an obstacle, which may make contact with the vehicle door 30, can be detected throughout the entire movable range of the vehicle door 30, when the vehicle door 30 is opened.

Figure 5:
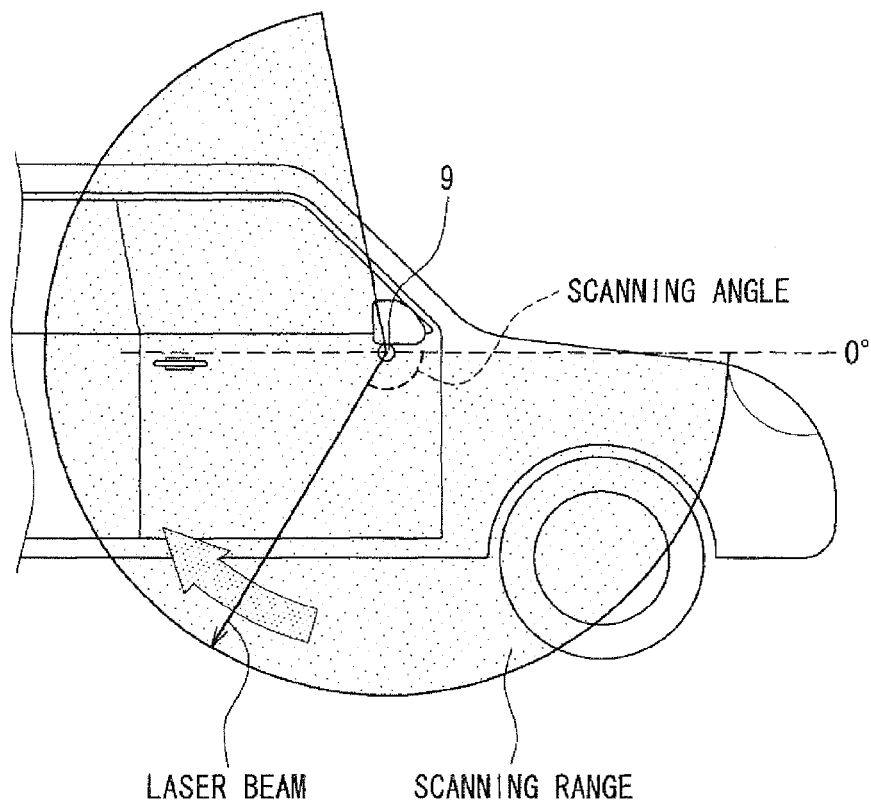
FIG. 5 is a schematic view showing a scanning range of the laser beam emitted from the laser sensor.

FIG. 5 is an explanation drawing for describing the scanning range of the laser sensor 9. As shown in FIG. 5, a start position (scanning angle of 0° of the scanning range of the laser sensor 9 is directed ahead the vehicle from a mount position of the laser sensor 9, which is at the lower portion of the door mirror 32. In the present structure, around the vehicle door 30, the laser sensor 9 can detect an obstacle, which exists ahead the vehicle from the mount position of the laser sensor 9 and may make contact with the vehicle door 30. The laser sensor 9 repeatedly emits the laser beam from the start position at an interval of predetermined step angle θx in the clockwise direction. For example, an end position of the emission of the laser beam from the laser sensor 9 is directed upward to the sky. More specifically, the end position is at about 260° of the scanning angle in the example of FIG. 5. As shown in FIG. 5, the scanning range of the laser sensor 9 is defined between the start position and the end position of emission of the laser beam. According to the present structure, the single element of the laser sensor 9 emits the laser beam to scan the scanning plane in the scanning range. Whereby, the single element of the laser sensor 9 is capable of detecting an obstacle, which may make contact with the vehicle door 30, through the substantially whole surface of the vehicle door 30.

It is noted that when the laser sensor 9 emits the laser beam to scan the scanning range shown in FIG. 5, the laser sensor 9 may receive light reflected from a body portion other than the vehicle door 30, the ground (land surface), or an obstacle, which may not make contact with the vehicle door 30. In this case, even when such an obstacle outside the movable range of the vehicle door 30 is detected, the opening of the vehicle door 30 need not be regulated. In view of the present subject, according to the present embodiment, the nonvolatile memory 4 beforehand stores obstacle detection range data for correctly determining whether an obstacle detected by the laser sensor 9 exists in the movable range of the vehicle door 30 or out of the movable range of the vehicle door 30. The obstacle detection range data include distance data (set distance L) from the mount position of the laser sensor 9 to an end of the vehicle door 30 at each of scanning angles θ of the laser beam.

The ECU 1 instructs the scanning angle of emission of the laser beam from the laser sensor 9. The laser sensor 9 emits the laser beam at the instructed scanning angle and receives light reflected from an obstacle or the like, and thereby to calculate a distance X to the obstacle and output a signal of the distance X to the ECU 1. The ECU 1 extracts the set distance L to the end of the corresponding vehicle door 30 from the stored obstacle detection range data based on the scanning angle θ of the laser beam emitted from the laser sensor 9. Further, the ECU 1 compares the distance X to the obstacle, which is actually detected by the laser sensor 9, with the extracted set distance L. According to the present comparison, when the detected actual distance X is less than the set distance L, the obstacle is determined to be existing in the movable range of the vehicle door 30 and to be making contact with the vehicle door 30. Alternatively, when the detected actual distance X is equal to or greater than the set distance L, the obstacle is determined to be out of the movable range of the vehicle door 30. Thus, in this case, it is determined that the obstacle may not exert an effect to the vehicle door 30 when the vehicle door 30 is opened and closed.

Figure 6:
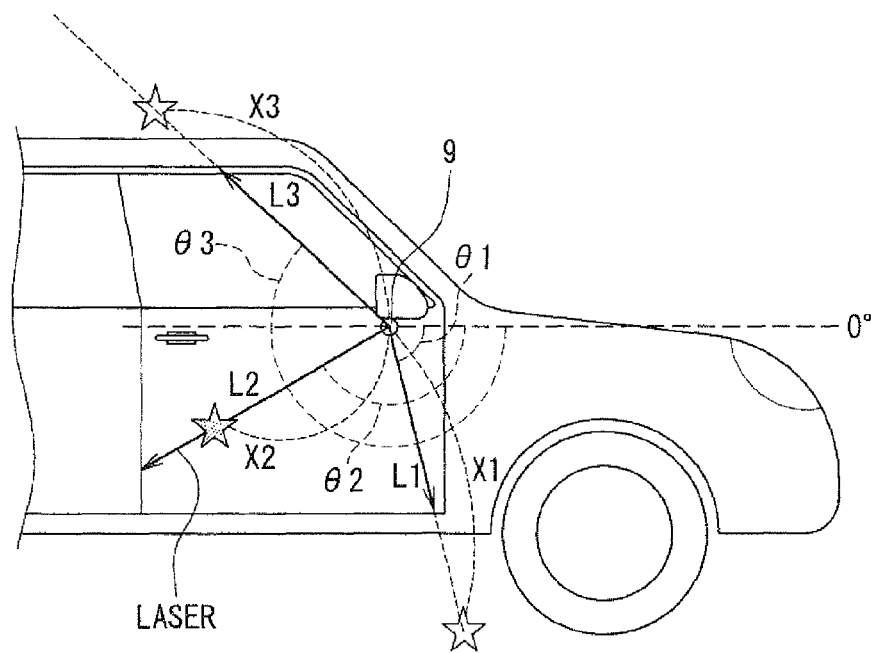
FIG. 6 is a schematic view showing an example of determination whether an obstacle exists in a movable range of the vehicle door based on obstacle detection range data.

FIGS. 6, 7 show one example, in which it is determined whether an obstacle exists in the movable range of the vehicle door 30 in accordance with the obstacle detection range data. In the example shown in FIGS. 6, 7, for example, the distance X1 to X3 to obstacles are calculated respectively for the scanning angles θ1 to θ3, and thereby the distances X1 to X3 are respectively compared with the set distances L1 to L3, which are stored correspondingly to the scanning angles θ1 to θ3 in the memory. As shown in FIG. 6, the set distances L1 to L3 are distances from the mount position of the laser sensor 9 respectively to the ends of the vehicle door 30 at the scanning angles θ1 to θ3 of the laser beam. In the example of FIGS. 6, 7, the set distances L1 and L3 are respectively compared with the distances X1 and X3 to the obstacles. As a result of the comparison, the distances X1 and X3 to the obstacles respectively detected at the scanning angles θ1 and θ3 are respectively determined to be longer than the set distances L1 and L3. Consequently, as shown in FIG. 7, it is determined that an obstacle, which may make contact with the vehicle door 30, does not exist at the scanning angles θ1 and θ3. On the other hand, the distance X2 to the obstacle detected at the scanning angle θ2 is compared with the set distance L2 and determined to be shorter than the set distance L2 as a result of the comparison. Consequently, as shown in FIG. 7, it is determined that an obstacle, which may make contact with the vehicle door 30, exists at the scanning angle θ2.

Subsequently, a vehicle door opening control performed in the ECU 1 will be described with reference to flow charts of FIGS. 8, 9. The flow chart of FIG. 8 shows a main routine of the vehicle door opening control, and the flow chart of FIG. 9 shows a detail of an obstacle detection operation in the main routine.

Figure 8:
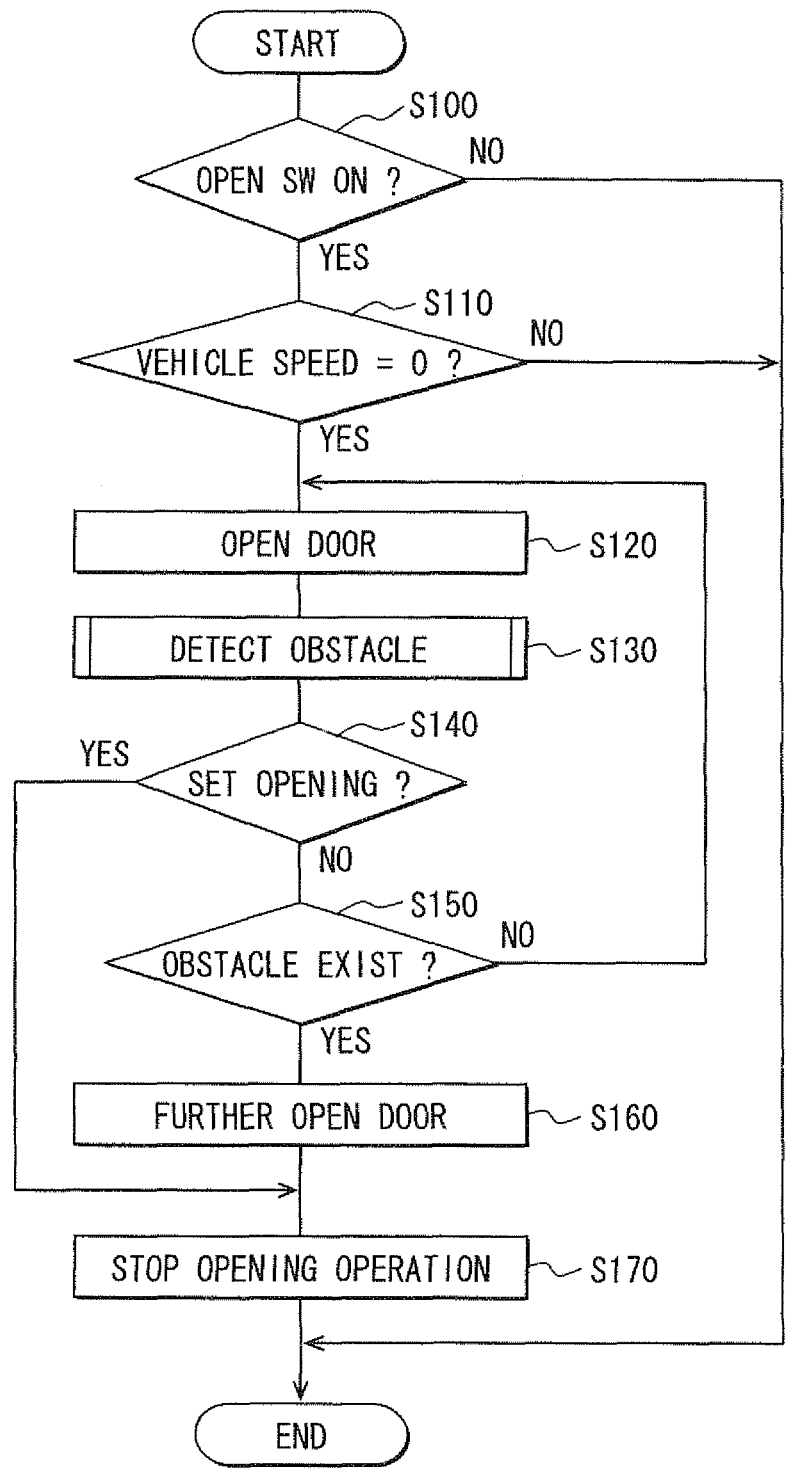
FIG. 8 is a flow chart showing a main routine of a vehicle door opening control processing.
Figure 9:
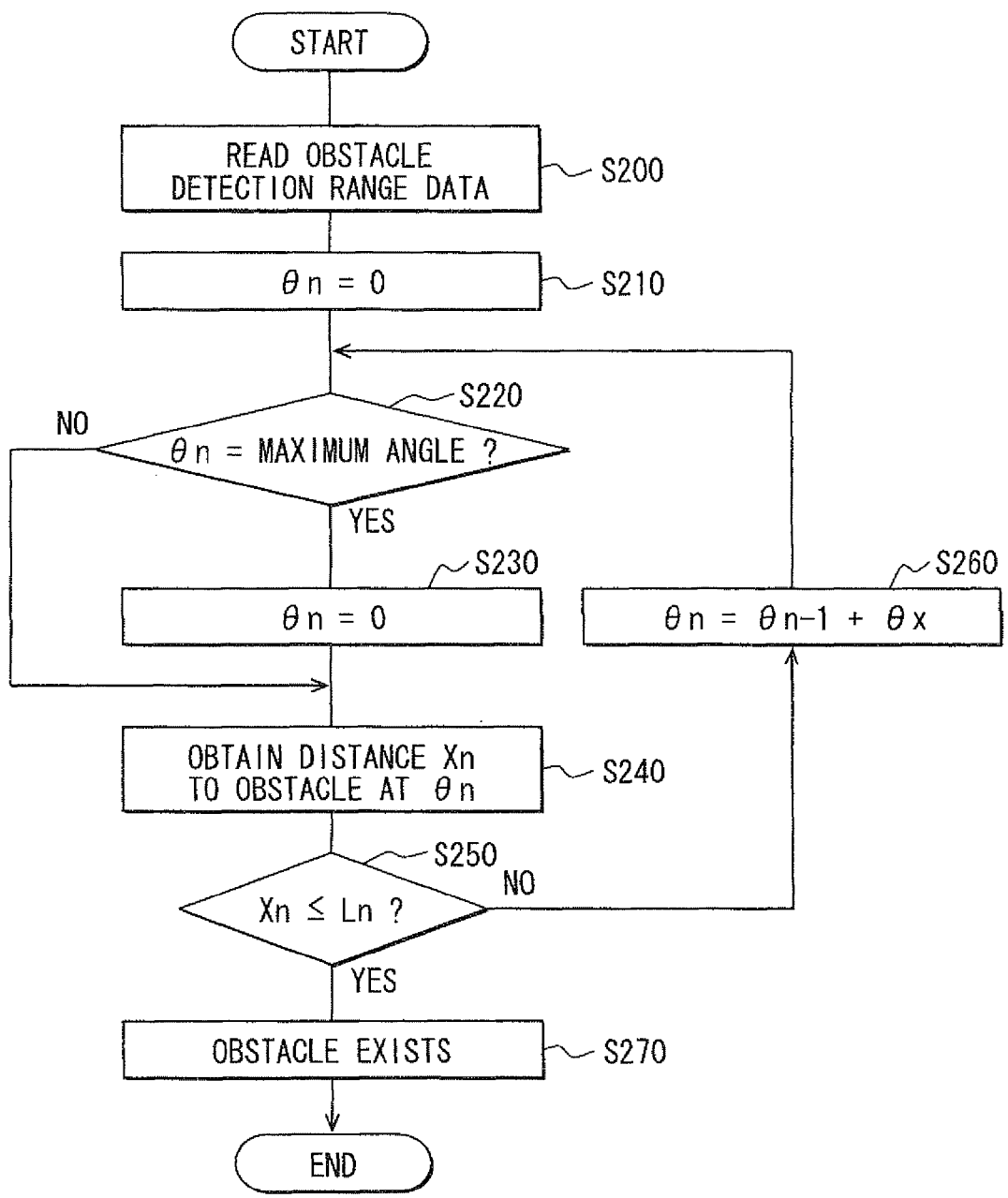
FIG. 9 is a flow chart showing an obstacle detection operation in the main routine of FIG. 8.

At step S100 of the flow chart of FIG. 8, it is determined whether the open switch 6 is activated by an occupant of the vehicle. When the open switch 6 is determined to be activated, the processing proceeds to step S110 where it is determined whether a vehicle speed is substantially zero in accordance with a vehicle speed signal obtained from the vehicle speed sensor 10. That is, at step S110, it is determined whether the vehicle stops. When the vehicle speed is determined to be substantially zero at step S110, the processing proceeds to step S120 where the motor driver 5 outputs a driving signal to the opening-and-closing motor 12 and the latch release motor 13 so as to start an opening operation of the vehicle door. At subsequent step S130, an obstacle, which may make contact with the vehicle door 30, is detected based on a detection signal of an obstacle by the laser sensor 9. The present obstacle detection operation will be described later in detail.

At step S140, it is determined whether the opening of the vehicle door 30 becomes a set opening (maximum opening)

in an automatic opening operation of the vehicle door 30 based on the detection signal of the opening sensor 11. When the opening of the vehicle door 30 is determined to become the set opening at step S140, the processing proceeds to step S170. Alternatively, when the opening of the vehicle door 30 is determined not to be the set opening at step S140, the processing proceeds to step S150. At step S150, It is determined whether an obstacle, which may make contact with the vehicle door 30, exists based on the detection result of the obstacle detection operation. At step S150, when it is determined that an obstacle does not exist, the processing returns to step S120. According to the present structure, the processing from step S120 to step S150 is repeated, and whereby the detection of an obstacle relative to the vehicle door 30 is continued during the opening operation of the vehicle door 30. When an obstacle is determined to be existing at step S150, the operation of the opening-and-closing motor 12 is continued even after detecting the obstacle at step S160. At step S160, the opening-and-closing motor 12 is further operated to increase the opening of the vehicle door 30 from the opening at the time of the detection of the obstacle by an angle, which is less than a predetermined angle φ. According to the present operation, the vehicle door 30 can be further opened as much as possible in a range such that the vehicle door 30 does not make contact with the obstacle. Therefore, convenience of the occupant of the vehicle can be enhanced.

It is noted that an obstacle may be detected immediately after starting of the opening operation of the vehicle door 30 when the vehicle door 30 is substantially closed completely. In this case, preferably, the latch release motor 13 simply cancels the latch mechanism to have the vehicle door in a half-door state, and the opening of the vehicle door 30 is preferably not to be further increased. The reason is that the distance between the vehicle door 30 and an obstacle cannot be accurately obtained when the obstacle is detected immediately after the laser sensor 9 starts detection of the obstacle in the condition where the vehicle door 30 is substantially closed. It is noted that the vehicle door may be mistakenly determined to have caused a failure when the vehicle door does not perform an opening operation at all. Therefore, the latch mechanism is preferably cancelled by the latch release motor 13.

At step S170, the operation of the opening-and-closing motor 12 is stopped. Whereby, the opening operation of the vehicle door 30 is stopped, and the opening of the vehicle door 30 is held at a constant degree.

Subsequently, the obstacle detection operation will be described with reference to the flow chart of FIG. 9. First, at step S200, the CPU 3 reads the obstacle detection range data from the nonvolatile memory 4. At subsequent step S210, the scanning angle θn is set as a value such as 0° equivalent to the start position of the scanning range. At step S220, it is determined whether the scanning angle θn becomes the maximum angle equivalent to the end position of the scanning range of the laser beam. When it is determined that the scanning angle θn becomes the maximum angle at step S220, the processing proceeds to step S230 where the scanning angle θn is reset to a value such as 0°, which corresponds to the start position of the scanning range of the laser beam.

At step S240, an instruction is sent to the laser sensor 9 so as to emit the laser beam at the set-up scanning angle θn. The laser sensor 9 calculates the distance to an obstacle based on a time lag between the emission of the laser beam and the acceptance of light reflected from the obstacle when receiving the reflected light corresponding to the emitted laser beam. When the laser sensor 9 does not receive the reflected light corresponding to the emitted laser beam within a predetermined time, the laser sensor 9 outputs a distance Xn, which is set to be longer than the set distance Ln.

At step S250, the distance Xn to the obstacle obtained from the laser sensor 9 is compared with the set distance Ln. When the distance Xn to the obstacle is determined to be greater than the set distance Ln in accordance with the comparison at step 250, the obstacle can be determined not be existing in the movable range of the vehicle door 30. Therefore, in this case, the processing proceeds to step S260. At step S260, the scanning angle θn is increased by a predetermined step angle θx and thereby updated. Subsequently, the processing returns to step S220 where the laser sensor 9 emits the laser beam at the updated scanning angle θn or the reset scanning angle θn.

Alternatively, when the distance Xn to the obstacle is determined to be less than the set distance Ln at step S250, the processing proceeds to step S270 where it is determined that the obstacle, which may make contact with the vehicle door 30, exists. In response to the processing at step S270, an obstacle is determined to be existing at step S150 in the main routine of FIG. 8.

In the obstacle detection operation in the flow chart of FIG. 9, while the vehicle door 30 is opened, the processings from step S220 to step S260 are repeatedly performed unless an obstacle is detected. The processings from step S120 to S150 of the main routine are also repeatedly performed simultaneously with the repetition of the processings of the obstacle detection operation. The processings of the obstacle detection operation may be a time-division operation with the processings from step S120 to S150.

Second Embodiment

As follows, the second embodiment will be described. In the first embodiment, the laser beam scans in the scanning range shown in FIG. 5, and an obstacle, which may collide against the vehicle door 30, is detected substantially throughout the entire surface of the vehicle door 30.

Figure 10:
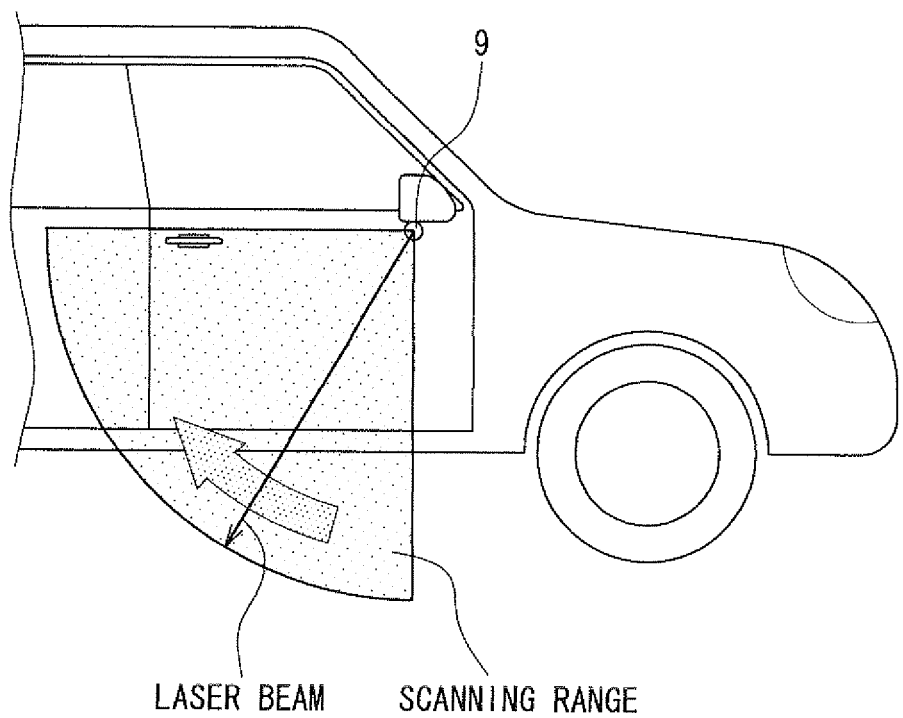
FIG. 10 is a schematic view showing a scanning range of the laser beam according to a second embodiment.

It is noted that, in general, a window is provided in an upper portion of the vehicle door 30, and an occupant of the vehicle can easily view a side of the vehicle through the window. Furthermore, the laser sensor 9 is provided near a rotation axis of the vehicle door 30. Therefore, a portion of the vehicle door located at a front side of the mount position of the laser sensor 9 is small. In addition, a movable range of the portion of the vehicle door when the vehicle door is opened is also small. Accordingly, necessity of detecting an obstacle by using the laser sensor 9 is relatively low in a portion of the vehicle door around the window or in the portion of the vehicle door located at the front side of the mount position of the laser sensor 9. Therefore, as shown in FIG. 10, the start position of the scanning range may be set at a directly lower position of the mount position of the laser sensor 9. In addition, the end position of the scanning range may be set at a position near an upper end of a portion of the vehicle door at the lower side of the window. The portion of the vehicle door at the lower side of the window may be a blind spot for an occupant of the vehicle. Nevertheless, by employing the scanning range of the laser beam according to the present embodiment, an obstacle, which exists around the portion of the vehicle door at the lower side of the window, can be substantially thoroughly detected. Furthermore, as described above, the scanning range of the laser beam is narrowed, and thereby power consumption can be reduced. In addition, response and accuracy of detection of an obstacle can be enhanced.

Third Embodiment

As follows, the third embodiment will be described. In the first embodiment, when an obstacle, which may make contact with the vehicle door 30, is detected, the opening of the vehicle door 30 is enlarged from the position at the time of the detection of the obstacle by the angle less than the predetermined angle θ. The surface of the vehicle door 30 may curve in the vertical direction or may have a protrusion and a recess so as to enhance its mechanical strength or design. The laser sensor 9 is capable of detecting the direction to an obstacle and the distance to the obstacle in the scanning range. Therefore, a portion of the vehicle door 30, to which the obstacle may make contact, can be determined. In the present embodiment, an angle, by which the vehicle door 30 continues the opening operation subsequent to detection of the obstacle, is changed in consideration of the curve of the surface of the vehicle door 30 and the degree of a protrusion and a recess of the vehicle door 30.

Figure 11:
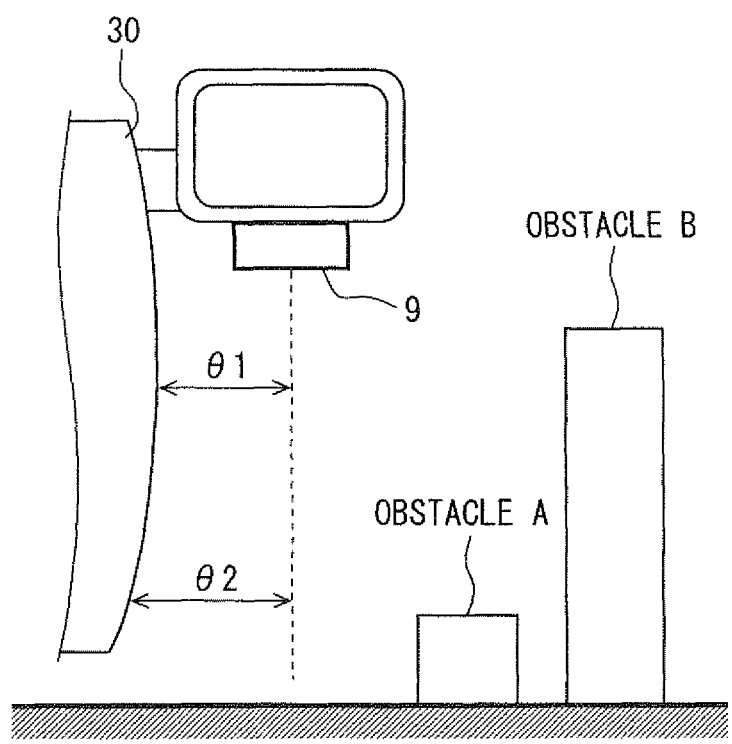
FIG. 11 is a schematic view showing a vehicle door position control apparatus according to a third embodiment.

According to an example shown in FIG. 11, when the laser sensor 9 detects an obstacle A, the obstacle A can be determined to making contact with a lower portion of the vehicle door 30. The lower portion of the vehicle door 30 curves to be recessed from a center portion of the vehicle door 30. Therefore, the opening operation of the vehicle door 30 is stopped after the vehicle door 30 is further opened by an angle subsequent to detection of the obstacle A, wherein the angle is less than an angle θ2 and defined by (θ2−α), which is equivalent to the distance to the lower portion of the vehicle door 30. The angle α is a margin angle determined for evading the obstacle A from making contact with the vehicle door 30. Alternatively, when an obstacle B, which is higher than the obstacle A in the height, is detected, the opening operation of the vehicle door 30 is stopped after the vehicle door 30 is further opened by an angle subsequent to detection of the obstacle B, wherein the angle is less than an angle θ1 (θ1<θ2) and defined by (θ1−α), which is equivalent to the distance to a portion of the vehicle door 30, which may make contact with the obstacle B. Each of the angle θ1−α and θ2−α is less than the predetermined angle φ from the opening of the vehicle door 30 at the time point of detection of the obstacle.

In the present structure, the angle of the vehicle door 30 is changed subsequent to detection of an obstacle in consideration of the shape of the vehicle door 30 such as a curve, a protrusion, and a recess of the vehicle door 30. Whereby, the opening operation of the vehicle door 30 can be performed as much as possible in a range, in which the vehicle door 30 does not make contact with the obstacle.

Fourth Embodiment

As follows, the fourth embodiment will be described. In the present embodiment, a scanning interval, at which the laser sensor 9 repeatedly emits the laser beam, is changed according to an opening speed of the vehicle door 30. For example, when the vehicle door 30 is automatically opened and closed, the opening-and-closing speed is switched at multiple steps. Alternatively, when an occupant of the vehicle manually opens the vehicle door 30, the opening speed of the vehicle door 30 is changed.

Figure 12A:
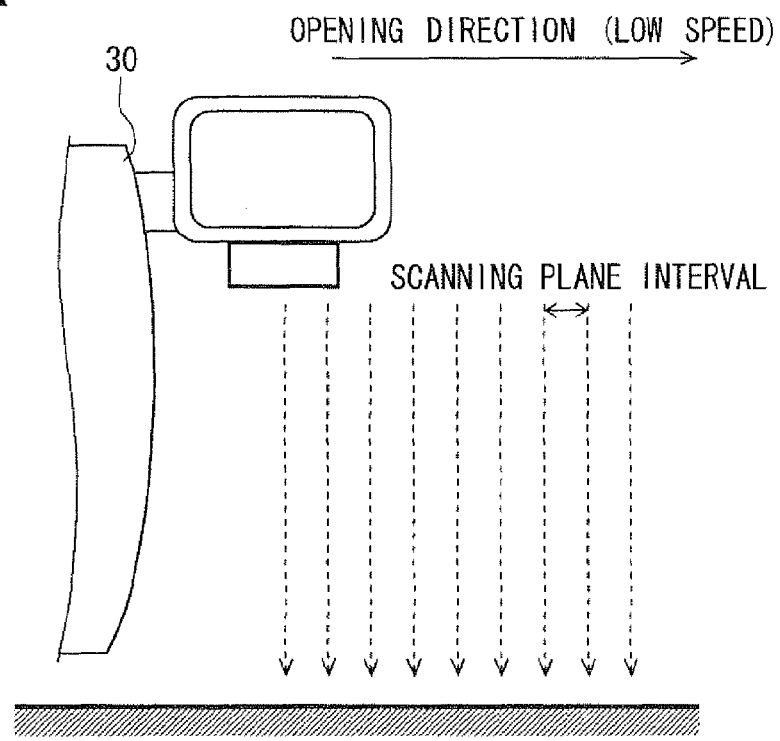
FIGS. 12A, 12B are schematic views each showing a vehicle door position control apparatus according to a fourth embodiment.
Figure 12B:
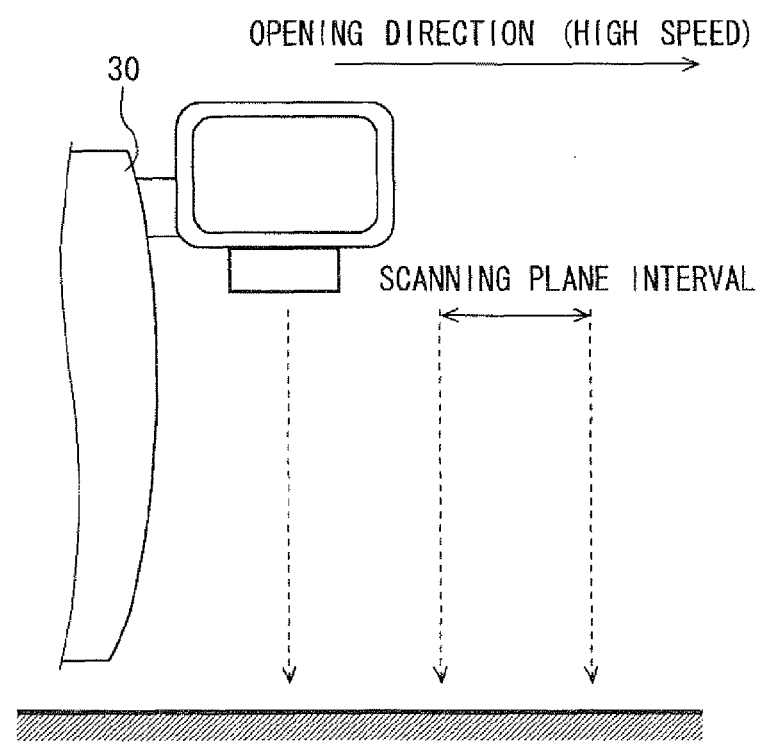

In these operations, when the laser sensor 9 scans the scanning plane by emitting the laser beam at a constant interval, a scanning plane interval, which is an interval of scanning planes, may be excessively shortened or excessively enlarged according to the opening speed of the vehicle door 30. Specifically, as shown in FIG. 12A, when the opening speed of the vehicle door 30 is low, the scanning plane interval is excessively shortened. Consequently, the laser sensor 9 performs excessive scanning operations and consumes excessive electricity, Alternatively, as shown in FIG. 12B, when the opening speed of the vehicle door 30 is high, the scanning plane interval is excessively enlarged. Consequently, the laser sensor 9 may not detect an obstacle, in dependence upon the size of the obstacle.

In view of the foregoing problems, in the present embodiment, the opening speed of the vehicle door 30 is obtained based on the opening position of the vehicle door 30 detected by the opening sensor 11. Further, the scanning interval of the laser sensor 9 is changed according to the opening speed. More specifically, when the opening speed is low, the scanning interval of the laser sensor 9 is enlarged. Alternatively, when the opening speed is high, the scanning interval is shortened. In the present structure, regardless of the opening speed of the vehicle door 30, the scanning operation of the laser sensor 9 can be performed substantially at a constant frequency until the vehicle door 30 reaches the maximum opening. Thereby, the scanning plane interval can be set at a substantially constant value.

Fifth Embodiment

As follows, the fifth embodiment will be described. In the present embodiment, the laser beam emitted from the laser sensor 9 is not directed along a perpendicular direction to the ground but slightly inclined relative to the perpendicular direction to the ground. Thus, the laser beam is directed to be distant from the vehicle door 30, as the laser beam goes forward.

Figure 13A:
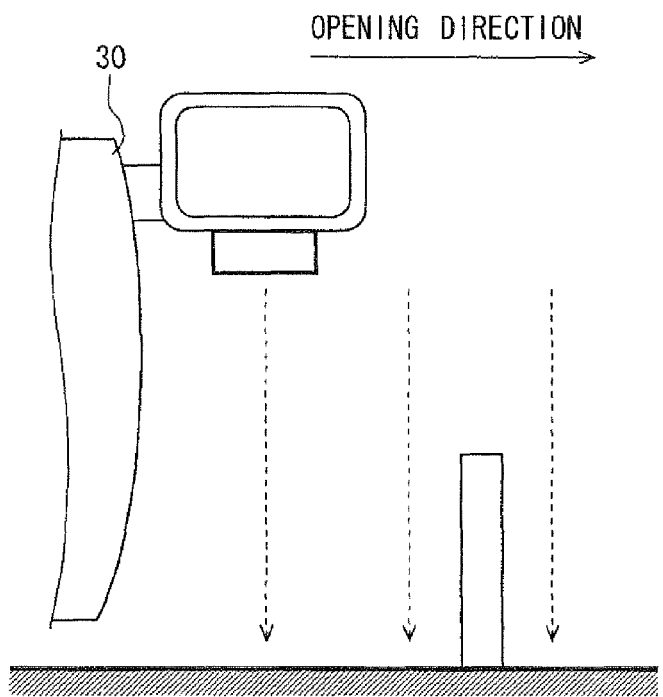
FIGS. 13A, 13B are schematic views each showing a vehicle door position control apparatus according to a fifth embodiment.
Figure 13B:
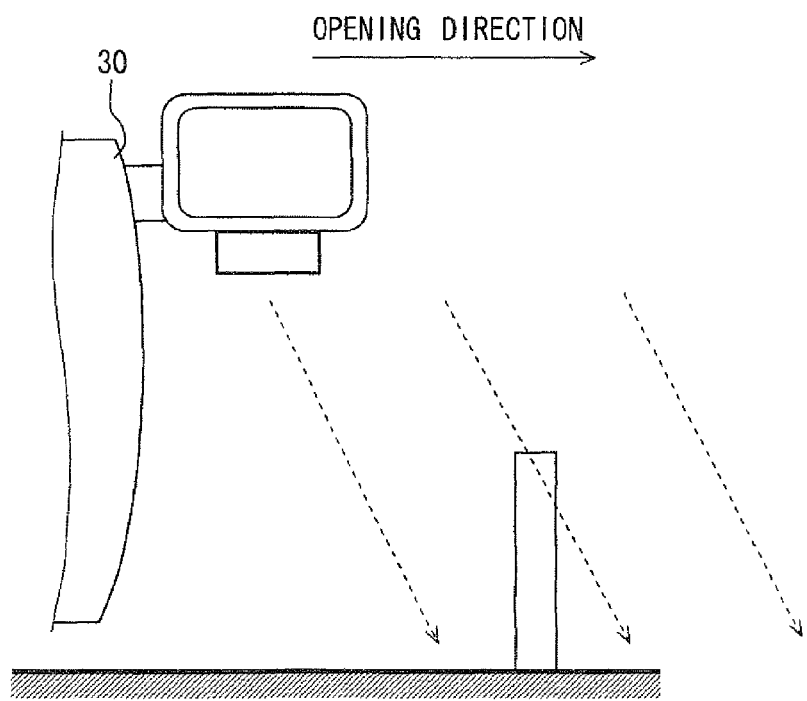

As described above, when the scanning interval of the laser sensor 9 is set constant and the opening speed of the vehicle door 30 is high, the scanning plane interval, which is the interval of the scanning planes of the laser sensor 9, is enlarged. Accordingly, as shown in FIG. 13A, an obstacle may not be detected in dependence upon the size such as the width of the obstacle. Therefore, in the present embodiment, as shown in FIG. 13B, the laser beam emitted from the laser sensor 9 toward the ground is slightly inclined relative to the perpendicular direction to the ground. Thereby, the laser beam is directed to be away from the vehicle door 30, as the laser beam proceeds forward. In the present structure, even when the scanning plane interval of the laser sensor 9 becomes large, an obstacle can be possibly detected.

For example, in the above embodiments, the laser sensor 9 scans the scanning plane, which is inclined relative to the surface of the vehicle door 30 by the predetermined-angle φ and located on the side at which the vehicle door 30 is opened. It is noted that when the mount position of the laser sensor 9 in the door mirror is sufficiently distant from the surface of the vehicle door 30, the scanning plane may be substantially in parallel to the surface of the vehicle door 30 and the laser sensor 9 may emit the laser beam to scan the scanning plane. That is, the predetermined angle φ may be 0°.

In the above embodiments, the opening of the vehicle door is regulated according to detection of an obstacle when the vehicle door automatically is opened. It is noted that at least one feature of the vehicle door control apparatus of the above embodiments may be applied to a vehicle in which a vehicle door is manually opened and closed by an occupant.

Figure 14:
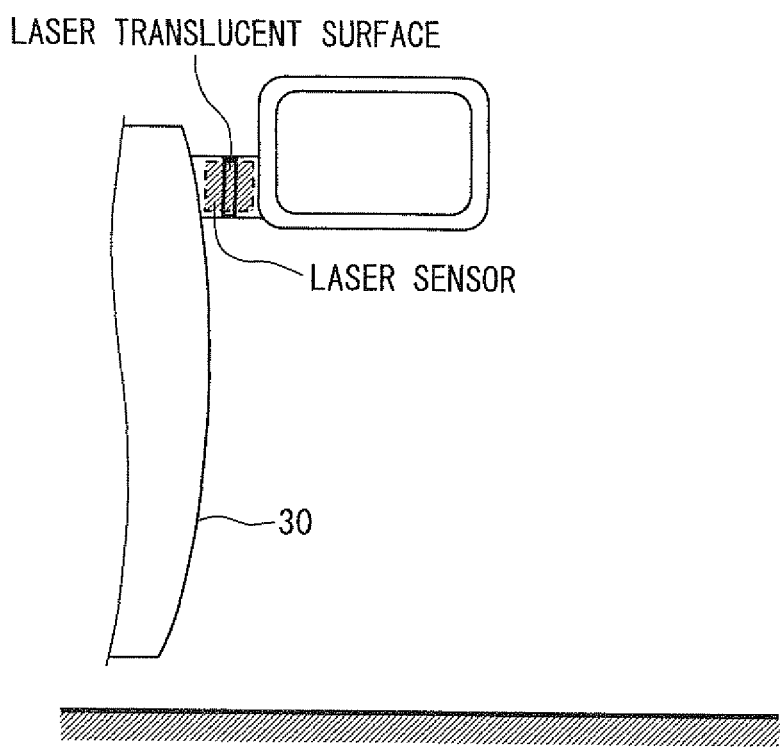
FIG. 14 is a schematic view showing a vehicle door position control apparatus according to a modification embodiment.

In the above embodiments, the laser sensor 9 is provided in the lower portion of the door mirror. Alternatively, the laser sensor 9 may be provided in a main body of the vehicle door. Further, as shown in FIG. 14, the laser sensor 9 may be provided to a support axis via which the door mirror is fixed to the vehicle door 30. In the present structure, design of the equipments can be enhanced, compared with a structure in which the laser sensor 9 is provided in the lower portion of the door mirror. Referring to FIG. 14, a part of the support axis of the door mirror may include a transparent member, which has a translucent surface through which the laser beam is emitted from the laser sensor 9, which is provided in the support axis.

Further, in the above embodiments, the laser sensor 9 emits the laser beam at the scanning angle θn instructed from the ECU 1, and the laser sensor 9 calculates the distance to the obstacle on acceptance and detection of the reflected light of the emitted laser beam. It is noted that the assignment of functions of the ECU 1 and the laser sensor 9 may be arbitrary determined. For example, the distance to an obstacle may be calculated in the ECU 1, and the laser sensor 9 may determine the scanning angle θn and emit the laser beam. It is noted that when the laser sensor 9 determines the scanning angle θn, the laser sensor 9 needs to communicate with the ECU 1 and send the scanning angle θn to the ECU 1.

Further, in the above embodiments, the vehicle door control apparatus is applied to the vehicle door via which an occupant gets on and off the vehicle. Alternatively, at shown in FIGS. 15A, 15B, the vehicle door control apparatus may be applied to a back door (rear hatch) 40 of a vehicle. In recent years, a large number of vehicles such as minivans employ power back doors. In such a vehicle, the back door 40 is automatically opened and closed in response to an operation of a switch by an occupant. In such a vehicle, by applying the vehicle door control apparatus, the back door 40 can be steadily protected from an obstacle when automatically opened.

Figure 15A:
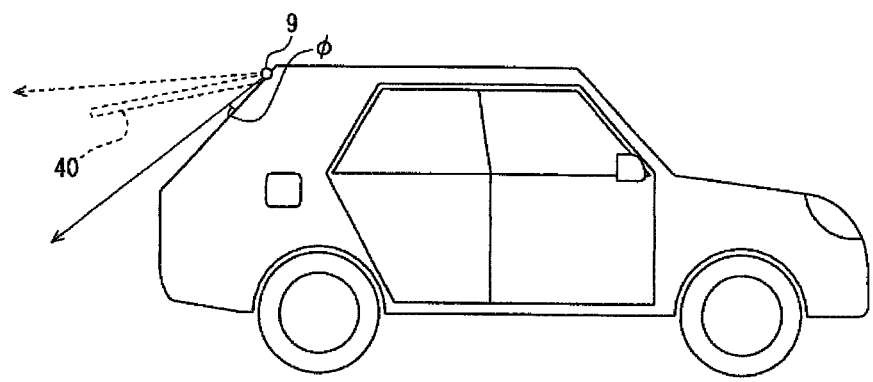
FIGS. 15A, 15B are schematic views each showing a vehicle door position control apparatus applied to a back door of a vehicle, according to a modification embodiment.
Figure 15B:
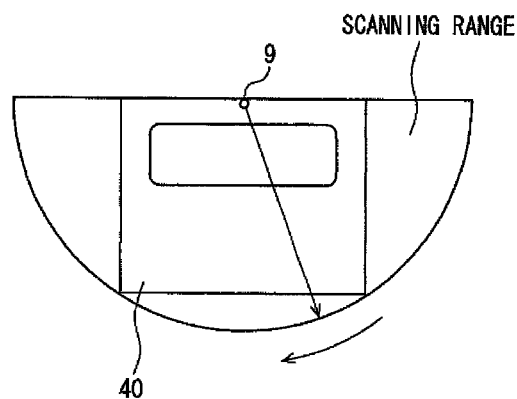

When the vehicle door control apparatus is applied to the back door 40, as shown in FIG. 15A, the laser sensor 9 may be provided to an upper portion of the back door 40 and located near a rotation axis of the back door 40. The laser sensor 9 emits the laser beam so as to scan a plane, which is at the predetermined-angle φ relative to the surface of the back door and located on the side at which the back door 40 is opened. As shown in FIG. 15B, the laser beam has an angular scanning range of about 180° between a start position (scanning angle of 0° and an end position so as to include the entire back door surface. The start position is at the right side in FIG. 15B from the mount position of the laser sensor 9 in the horizontal direction. The end position is at the left side in FIG. 15B from the mount position of the laser sensor 9 in the horizontal direction.

The vehicle door control apparatus may be applied to a control of a side air bag device 100 (FIG. 1). Specifically, in a vehicle having a side air bag device 100, the vehicle door control apparatus may control deployment of the side air bag. In this case, in the vehicle door control apparatus, the laser sensor emits the laser beam and accepts the reflected beam when the vehicle runs. When an obstacle is determined to be existing on the opening side of the vehicle door based on a result of emission of the laser beam and acceptance of the reflected light, the vehicle door control apparatus may output a detection signal of the obstacle to a device for controlling the side air bag. When an obstacle is detected extremely near the vehicle door while the vehicle runs, the obstacle has a high possibility of another vehicle such as a car or a two-wheeled vehicle, which is going to collide against the lateral side of the vehicle. As described above, when the vehicle door control apparatus is applied, another car, which is going to collide against the vehicle, can be detected before the car actually collides. Therefore, safety of an occupant of the vehicle can be easily secured.

The vehicle door control apparatus may be applied to an anticrime device. More specifically, the vehicle door control apparatus may activate a warning device 110 (FIG. 1). In this case, in the vehicle door control apparatus, the laser sensor emits the laser beam and accepts the reflected beam after a user gets off the vehicle and locks the vehicle. When an obstacle is determined to be existing on the opening side of the vehicle door based on a result of emission of the laser beam and acceptance of the reflected light, the vehicle door control apparatus may output a detection signal of the obstacle to the warning device. When an obstacle is detected extremely near the vehicle door of the vehicle, which the user get off and lock, the obstacle has a high possibility of suspicious person. As described above, a suspicious person is detectable, and thereby a performance of anticrime of the vehicle can be enhanced.

The above structures of the embodiments can be combined as appropriate. For example, the fourth embodiment may be combined with the fifth embodiment, and the scanning interval may be changed while the emission of the laser is inclined to the perpendicular direction to the ground.

The above processings such as calculations and determinations are not limited being executed by the ECU 1. The control unit may have various structures including the ECU 1 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle door control apparatus for a vehicle, comprising:
    a laser sensor located to move with a vehicle door about a rotation axis of the vehicle door, the laser sensor including a single emitting element configured to emit a laser beam, a rotatable mirror configured to reflect (a) the emitted laser beam and (b) returning laser beam light reflected from the obstacle, and a single element acceptance unit configured to accept the returning light reflected from an obstacle and the mirror, for scanning a scanning plane shifted relative to a surface of the vehicle door in a door-opening direction, in which the vehicle door is openable;
    determination means for determining whether the obstacle, which is possible to make contact with the vehicle door, exists in the door-opening direction of the vehicle door, based on a result of emission and acceptance of the laser beam of the laser sensor;
    a speed detection means for detecting speed of opening the vehicle door; and
    opening regulating means for regulating an opening of the vehicle door in response to determination of the determination means that the obstacle exists,
    wherein
    the laser sensor changes an interval at which the laser sensor repeats emission of the laser beam according to the speed detected by the speed detection means;

the determination means pre-stores a pre-stored distance from a mount position of the laser sensor to an end of the vehicle door in a scanning direction of each emission of the laser beam;

the determination means is configured to calculate an actual distance to the obstacle based on the result of emission and acceptance of the laser beam of the laser sensor;

the determination means determines that the obstacle exists when the actual distance to the obstacle is less than the pre-stored distance;

the scanning plane is inclined from the surface of the vehicle door by a predetermined angle in the door-opening direction, and the opening regulating means is configured to regulate the opening of the vehicle door when the vehicle door is further opened by an angle, which is less than said predetermined angle, from an opening position of the vehicle door at a time point where the determination means determines that the obstacle exists.

* * * * *